United States Patent
Larsson et al.

(10) Patent No.: US 6,226,747 B1
(45) Date of Patent: May 1, 2001

(54) METHOD FOR PREVENTING SOFTWARE PIRACY DURING INSTALLATION FROM A READ ONLY STORAGE MEDIUM

(75) Inventors: Jeffrey E. Larsson, Seattle, WA (US); Alan Richardson, West Jordan, UT (US); Paul A. Steckler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/058,946

(22) Filed: Apr. 10, 1998

(51) Int. Cl.[7] .................................................. G06F 9/445
(52) U.S. Cl. ............................ 713/200; 717/11; 705/51; 360/60
(58) Field of Search ........................... 395/712, 652; 713/200; 717/11

(56) References Cited

U.S. PATENT DOCUMENTS

| | | | | |
|---|---|---|---|---|
| 4,577,289 | * | 3/1986 | Comerford et al. | 360/60 |
| 4,593,353 | * | 6/1986 | Pickholtz | 705/55 |
| 4,688,169 | * | 8/1987 | Joshi | 340/825.34 |
| 4,864,494 | * | 9/1989 | Kobus, Jr. | 713/200 |
| 5,014,234 | * | 5/1991 | Edwards, Jr. | 713/200 |
| 5,027,396 | * | 6/1991 | Platteter et al. | 713/185 |
| 5,113,518 | * | 5/1992 | Durst, Jr. et al. | 713/200 |
| 5,182,770 | * | 1/1993 | Medveczky et al. | 705/56 |
| 5,379,433 | * | 1/1995 | Yamagishi | 713/200 |
| 5,490,216 | * | 2/1996 | Richardson, III | 705/59 |
| 5,553,143 | * | 9/1996 | Ross et al. | 705/59 |
| 5,579,479 | * | 11/1996 | Plum | 713/202 |
| 5,615,061 | * | 3/1997 | Singh | 360/60 |
| 5,625,690 | * | 4/1997 | Michel et al. | 705/53 |
| 5,666,411 | * | 9/1997 | McCarty | 705/51 |
| 5,671,412 | * | 9/1997 | Christiano | 707/104 |
| 5,737,416 | * | 4/1998 | Cooper et al. | 705/52 |
| 5,754,864 | * | 5/1998 | Hill | 717/11 |
| 5,761,649 | * | 6/1998 | Hill | 705/27 |
| 5,909,581 | * | 6/1999 | Park | 717/11 |
| 6,006,190 | * | 12/1999 | Baena-Arniaz et al. | 705/1 |

OTHER PUBLICATIONS

Rife, R.C.; "Software Piracy". IEE/IEEE Electronic Library [online]. Northcon/94 Conference Record, pp. 364–366, Oct. 1994.*

Spesivtsev et al., "Software Copy Protection Systems: Structure, Analysis, Attacks". IEE/IEEE Electronic Library[online]. IEEE 1992 International Carnahan Conference on Security Technology, pp. 179–182, Oct. 1992.*

Hauser, R. C.; "Does Licensing Require New Access control Techniques?". ACM Digital Library[online]. Communications of the ACM, vol. 37, Iss. 11, pp. 48–55, Nov. 1994.*

Spesivtev et al.; "Krypton–Crypto–Based Access Control System". IEE/IEEE Electronic Library[online]. IEEE 1992 International Carnahan Conference on Security Technology, Crime Countermeasures, pp. 169–171, Oct. 1992.*

* cited by examiner

*Primary Examiner*—Tariq R. Hafiz
*Assistant Examiner*—Kelvin E. Booker (57) ABSTRACT

The method and system for limiting the number of installations of a computer software program located on a read only disk from the read only disk to a computer. The read only disk is linked to a removable read/write memory by data on the removable read/write memory corresponding to data on the read only disk. Prior to installation of the computer software program from the read only disk to the computer, software residing on the removable read/write memory determines whether the installation is authorized. Such determination is made by comparing identification information corresponding to computers on to which the computer software program has previously been installed to installation limitations dictated by a software license agreement.

14 Claims, 5 Drawing Sheets

METHOD FOR PREVENTING SOFTWARE PIRACY DURING INSTALLATION FROM A READ ONLY STORAGE MEDIUM

TECHNICAL FIELD

This invention relates to a method and system for limiting the number of installations of a computer software program from a compact disk to a computer. More specifically, the present invention deters software piracy by detecting hardware during software installation, comparing the hardware to other hardware on which the software has been previously installed and either allowing or disallowing the installation based on predetermined factors.

BACKGROUND OF THE INVENTION

In the context of computer software, today's pirates bear little resemblance to their swashbuckling counterparts of times long ago. Nonetheless, modern day computer software piracy is every bit as economically devastating as its ancient forerunner. Moreover, modern software pirates are far more difficult to identify and counteract than were the black-clad, sword wielding variety.

Generally, software pirates assume one of two forms. First, the highly skilled "commercial" pirate produces unauthorized copies of computer software for distribution without consent of the software manufacturer. Such commercial piracy requires some level of sophistication. Moreover, specialized equipment may be necessary to duplicate software to a receptive media, such as a compact disk. Such equipment is not readily available. For the economic damage caused by such commercial pirates, it pales in comparison to losses caused by "recreational pirates".

Recreational pirates are authorized users of the computer software who seek to exceed the limits of their authorization. More specifically, when an individual purchases computer software, a "limited use"-type license is conveyed by the manufacturer to the purchaser. Typical computer software limited use licenses may authorize installation of the software onto a limited number of computers, contemplating the purchaser's home, office and portable needs. The purchaser becomes a pirate when either the software is installed on computers belonging to individuals other than the purchaser, the software is installed on a greater number of machines than authorized by the license, or the software is sold by the purchaser to a subsequent purchaser without authorization by the manufacturer.

The nature of recreational piracy makes it difficult for software manufacturers and distributors to combat. Seldom do recreational pirates utilize established distribution networks or make the pirated software available to large numbers of unauthorized users. Nonetheless, the vast number of users whose use of licensed software exceeds the limits of their authorization has made recreational piracy a billion dollar drain on software sales revenues. Accordingly, several attempted solutions to recreational piracy have been commercially implemented.

In particular, the media of choice for commercial distribution of software has long been the floppy disk. Floppy disks are normally capable of supporting both read and write functions. To protect against unauthorized use, floppy disks were copy-protected. The contents of such copy-protected disks could not then be copied to a storage device internal to a computer. In other words, the floppy disk carrying the software had to actually be in a disk drive of the computer before the software could be used.

Problems with this arrangement were two-fold. First, only one user could use the software at any given time. As limited use software licenses evolved, such a restriction was often at odds with the more contemporary and acceptable practice of allowing one purchaser to purchase one software program and load it on each of several computers. Second, because running software from a floppy disk is much slower than running software from an internal computer memory device (such as a "hard drive"), software performance was severely handicapped by requiring the software to be read directly from the floppy disk during use in situations when that particular arrangement was required.

Another anti-piracy approach required a "dongle" or hardware key to insure that the software could only be used on one computer at a time. Physically attaching the dongle to a computer port enabled the use of the software. Though effective, this method still prohibited use of the software on, for instance, both home and office computers without the dongle attached. Rather, the user was required to carry the dongle back and forth so that it could be physically attached to the computer before the software was used. Without the dongle, the software could not be used.

More recently, the Acme 1.2 anti-piracy system was developed by Microsoft Corporation for use with floppy disks. Floppy disks containing the Acme 1.2 system permitted a user to install software from a floppy disk to a computer after verification that the installation was authorized. Authorization was determined by the number of times the software had been previously installed on different computers as compared to the number of installations permitted under the limited use license agreement. Specifically, such determination was made by directing the computer to write computer-specific identification information to the floppy disk on which both Acme 1.2 and the software program resided. After the identification information was written to the disk, Acme 1.2 either allowed or disallowed installation of the software program to the computer, depending on the number of different computers onto which the software had already been installed. Despite the advances of Acme 1.2 over prior methods of anti-piracy protection, shortcomings still existed.

Notably, when the software industry shifted from the floppy disk to the "read only" or "compact disk" (CD) as the media of choice for distribution of software, the Acme 1.2 system was no longer effective because computer identification information cannot be written to a CD during software installation. Without such ability, comparison between the number of computers onto which the software has been installed and the number of authorized installations cannot be performed as was done by Acme 1.2.

Additionally, anti-piracy systems such as Acme 1.2 allowed only the predetermined number of installations without contemplating frequently occurring exceptions that caused inconvenience and embarrassment to authorized users. For instance, if a user was allowed three installations and thereafter installed the software on three computers, Acme 1.2 would prevent further installation. If the user purchased a new computer planned to discard an old computer on which the software had been installed, installation of the software onto the new computer could not be accomplished because the installation limit had been met, despite the fact that the user would only be using the software on three computers, as intended and allowed by the license.

Another such exception occurred when a user installed the software on the allowed number of computers and one of the computers later required reformatting of the hard drive. Because reformatting a hard drive changes the identification information of the computer, Acme 1.2 would not allow re-installation to the same computer because it would recognize the new identification information as identification information of a different computer. Such identification would prevent the otherwise authorized installation.

These exceptions could be resolved by providing a read/write media such as a floppy disk with the sale of computer software on a CD, but for certain logistical difficulties. For example, the existence of an Acme 1.2-type system on a separate floppy disk could allow unscrupulous pirates to use a floppy disk sold in connection with one inexpensive software program to use the floppy disk to install more expensive software. If the installation authorization for the more expensive software had been exhausted, such use of interchangeable floppies could lead to improperly exceeding the installation allowance of different, more expensive software.

Furthermore, few laptop-type computers have floppy disk and CD drives which can be operated simultaneously. As such, a user who desires to install piracy-protected software from a CD to a laptop may have to exchange drives during installation (if possible) in order to execute the Acme 1.2-type authorization check contained on a floppy disk.

Therefore, in the context of protection of software from recreational piracy, there is a need to protect software distributed on CD without requiring cumbersome computer attachments, exchange of disk drives or other specialized computer equipment.

Additionally, there is a need to provide anti-piracy protection which allows the removal of the installed software from one computer and alternate installation on a different computer without treatment of the two installations as separate installations counted against a total number of authorized installations.

There is yet another need for an anti-piracy system which allows an authorized user to reinstall the software on a computer after the computer has been reformatted, also without treatment of the two installations as separate installations counted against a total number of authorized installations.

SUMMARY OF THE PRESENT INVENTION

The present invention satisfies the above-described needs by providing a system and method for limiting the number of installations of a computer software program stored on a read only device such as a compact disk (CD) from the CD to one or more computers. In one embodiment of the present invention, a removable read/write storage memory, such as a floppy disk, is linked to the CD. Linking the floppy disk to the CD is accomplished by storing data on the floppy disk corresponding to data on the CD. Upon initiation of the installation of the computer software program from the CD to the computer, the user is requested to insert a floppy disk into the computer. The present invention then determines whether installation of the computer software from the CD to the computer is authorized by comparing identification information of the computer to identification information previously stored on the floppy disk. If the identification information of the computer has not been previously stored on the floppy disk, and if the computer software program has not been installed in excess of the limits of the license, the installation of the computer software from the CD to the computer is allowed. If, on the other hand, the linked floppy disk is not present or the user has previously installed the computer software on a number of computers equaling the terms of the license agreement, installation is disallowed.

In another aspect of the present invention, a method is described for allowing a user to uninstall software from a particular computer and, as a result of such removal, the user is allowed to perform an additional installation of the computer software to a different computer. This process makes it easier for an authorized user to install computer software on, for instance, a new computer without having to suffer the difficulty and embarrassment of obtaining an installation "work-around" from the software manufacturer.

Yet another aspect of the present invention provides a laptop bypass feature by which a user may install the computer software to a laptop or any other computer having only one disk drive, without being blocked by the piracy protection of the present invention.

Still another aspect of the present invention is a method for detecting recent reformatting of the hard drive of the computer onto which the user seeks to install the computer software. Reformatting a hard disk may create new computer identification information for the computer. As such, an attempt to install the computer software program to the computer after reformatting will seem to the present invention to be an installation to a completely different computer. Such a situation is problematic if the user has already installed the computer software onto a number of computers equaling the limits of the license agreement. In such a situation, the present invention will detect the chronological proximity between the installation of the computer's operating system (usually indicative of reformatting) and the attempted installation of the computer software from the CD. If predetermined criteria for chronological proximity is met, the present invention will presume recent reformatting of the computer hard disk. Accordingly, installation of the computer software to the computer would be allowed without regard to the number of previous installations performed.

These and other advantages of the present invention will be appreciated from studying the following detailed description and drawings, and the appended claims.

BRIEF DESCRIPTION OF THE DRAWINGS

FIG. 2, consisting of FIGS. 2a–2b, is a flow diagram illustrating the operational steps of an exemplary embodiment of the present invention.

DETAILED DESCRIPTION

The present invention is directed to a method and system for limiting the number of installations of a computer software program located on a "read only" disk from the read only disk to a computer. In the preferred embodiment, the invention may be incorporated into an anti-piracy system such as Acme 3.0, which is marketed by Microsoft Corporation of Redmond, Wash. Furthermore, the present invention may also be referred to as "Hardware Detection During Install" or "HDDI".

Briefly described, the present invention limits the number of installations of a computer software program stored on a read only device such as a compact disk (CD), from the CD to one or more computers. In an exemplary embodiment, computers have a permanent read/write storage device (such as a hard drive), an optical disk drive for the CD, and a removable read/write storage memory (such as a floppy disk). The CD is linked to the floppy disk by information stored on the floppy disk corresponding to information on the CD. After the link between the CD and floppy disk is verified, installation of the software from the CD to the hard drive of the computer may be accomplished.

More specifically, in response to the initiation of software installation from the CD to the computer, the user is requested to insert the floppy disk into the computer. The method of the present invention first determines if the inserted floppy disk is properly linked to the CD. Once the proper link has been verified, the method of the present invention determines whether the installation of the computer software from the CD to the computer is authorized by comparing identification information of the computer to identification information of other computers on which the software has been previously installed. If the installation is authorized, installation of the software to the computer is allowed. If the installation is not authorized, the installation is disallowed.

Although the preferred embodiment will be generally described in the context of a software program being on a CD and a floppy disk being the removable read/write memory, those skilled in the art will recognize that the present invention also can be implemented in conjunction with other memory or data storage devices.

The detailed description which follows is represented largely in terms of processes and symbolic representations of operations by a conventional computer. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure. A "data packet" is type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

Exemplary Operating Environment

Figure 1:
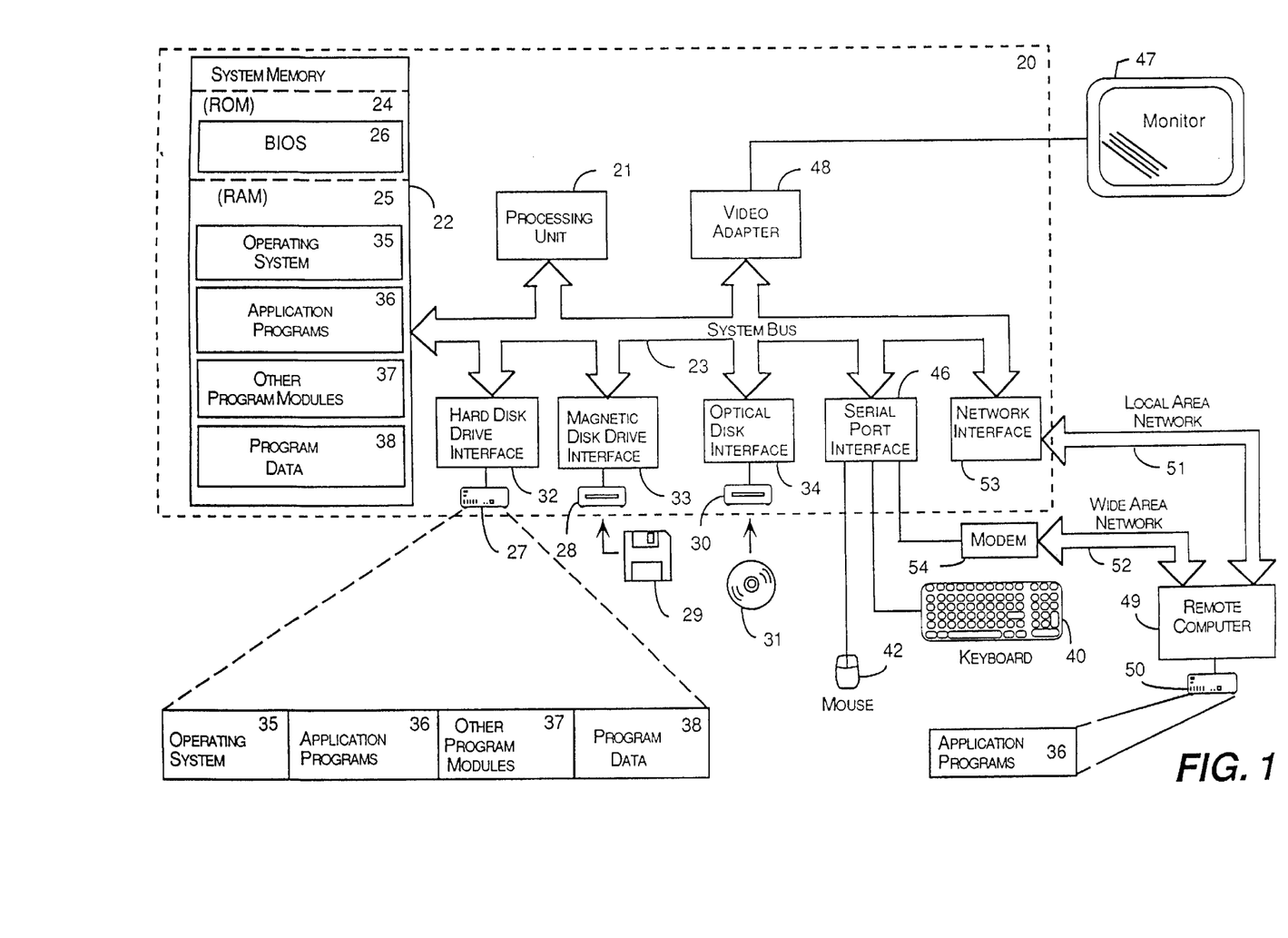
FIG. 1 is a block diagram of a computer system representing the operating environment of an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The HDDI Program Module

Figure 2A:
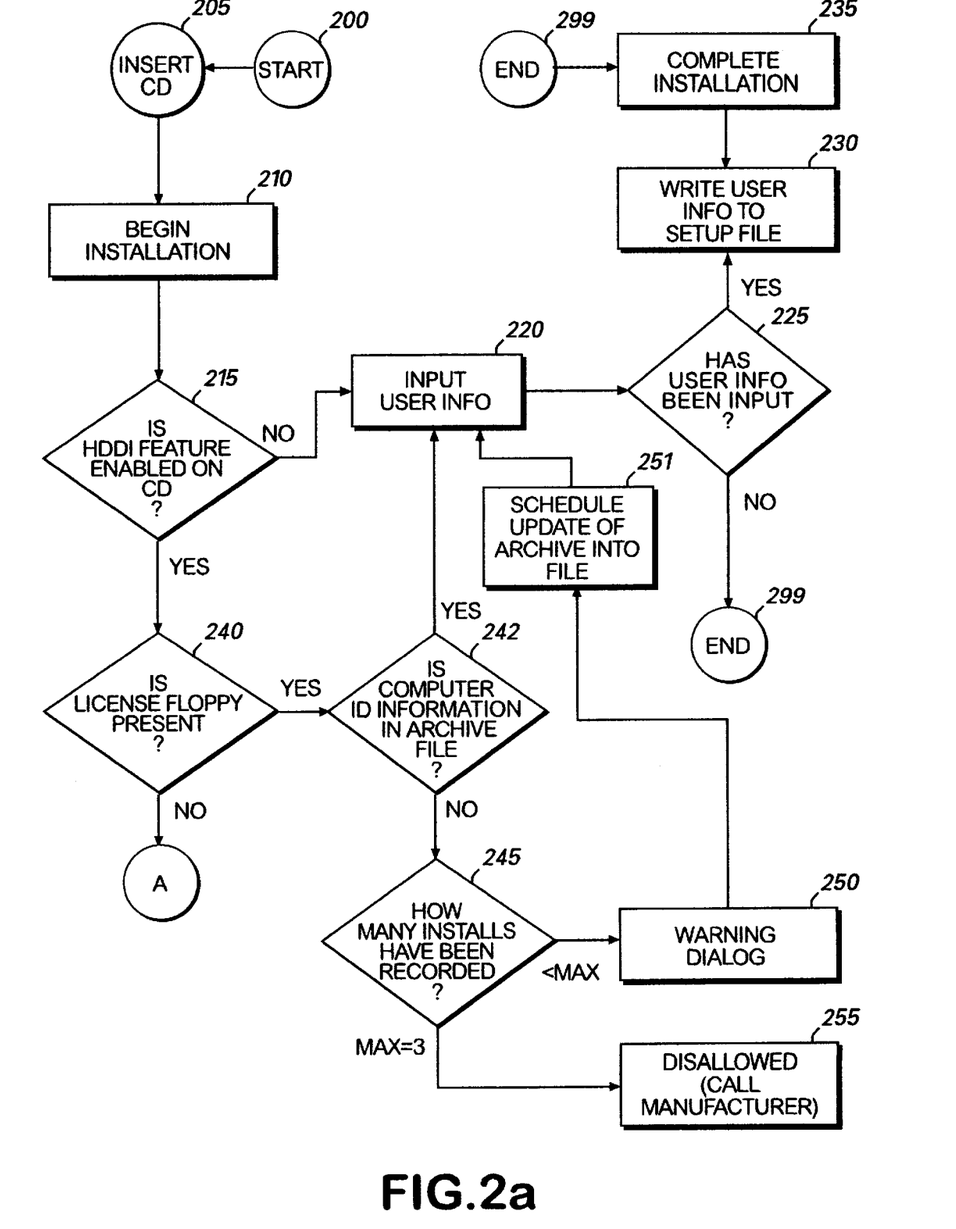
Figure 2B:
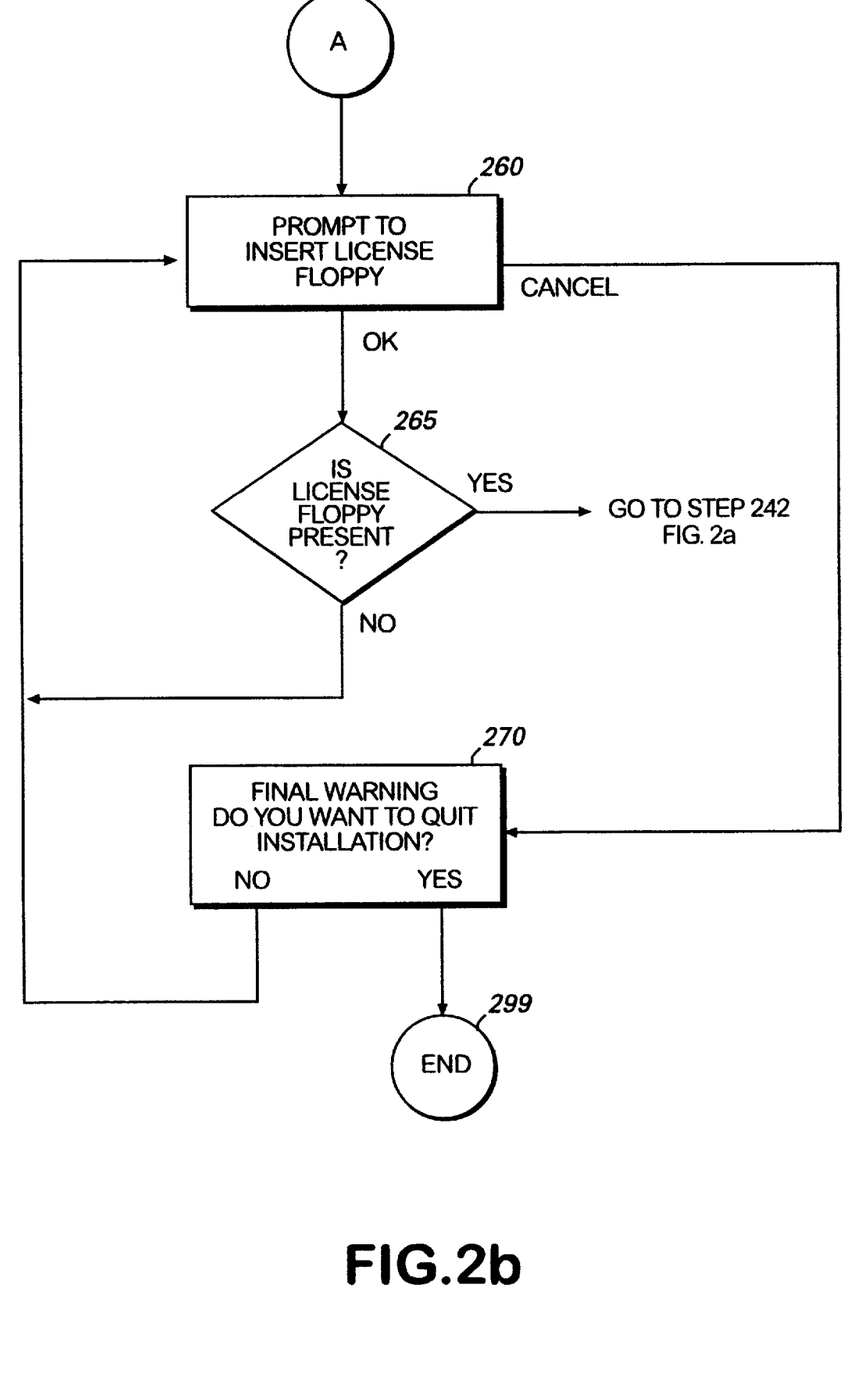

Turning now to FIGS. 2a–2b, a flow diagram illustrating the operational steps of an exemplary embodiment of the method of the present invention is depicted.

The method of the present invention begins as step 200 and, at step 205, the CD 31, on which the software program is stored, is inserted into the optical disk drive 30. Installation of the software program begins at step 210 in a well known manner. As installation begins, the processing unit 21 reads initialization information from the CD 31 via the optical disk drive 30 and optical disk interface 34. As shown in decision block 215, if the HDDI feature is not present or, alternately, is present but not enabled on the CD 31, the processing unit 21 of the computer 20 will direct installation of the software program in a conventional manner.

Namely, in such conventional installation, the processing unit 21 may prompt the user to input certain user information, shown at step 220, to gain access to the software. Prompts from the processing unit 21 will typically be delivered to the user via monitor 47, although other types of prompts, such as audio prompts, may be equally effective. The varieties of user input which may be required are numerous and may include a password, name, authorization number, etc. If user information is required and is not input, the method of FIG. 2a ends at step 299. If, on the other hand, user information is input at step 225, the user information is written to a setup file residing on the processing unit 21, shown at step 230.

After the user information has been written to the setup file, installation of the software onto the computer hard drive 27 occurs and, at step 235, installation is. completed. Thereafter, the method ends at step 299 and the software is available for use by the user.

If, on the other hand, the HDDI feature is enabled on the CD, the user will be prompted to insert a removable read/write storage device into the computer. Most commonly, the read/write storage device will be a floppy disk, although any of a variety of other readable/writable storage devices may be used, as previously discussed with reference to FIG. 1.

A notable aspect of the floppy disk is that it is "linked" to a particular CD. In the context of the present invention, the link between the CD and its floppy disk may be created during manufacture. More specifically, as floppy disks are manufactured for use with the present invention, each floppy disk may be embedded with data corresponding to data on a CD to which it is linked. Examples of such data may be software serial numbers or simply specific software version identifiers. Floppy disks embedded with such corresponding data are hereafter referred to as "license floppies" to distinguish them from floppy disks which are not embedded with data corresponding to a particular linked CD.

Referring back to FIG. 1, a software purchaser who purchases a software CD 31 on which the HDDI feature is enabled will receive an accompanying "license floppy" 29. The license floppy 29, as discussed, may only correspond to one CD 31 or, alternately, may correspond to a group of CDs carrying one specific version of a software program. As indicated in decision block 240 of FIG. 2a, software resident on a CD on which the HDDI feature is enabled will then determine in accordance with the present inventive method whether the license floppy 29 is present. Specifically, if a floppy disk is present in a magnetic disk drive 28, the CD 31 will direct an inquiry to determine whether corresponding data exists on the floppy disk. If not, the method of the present invention may disallow any attempt to read, load, or run the software residing on the CD 31. If such corresponding data is present on the floppy disk, the floppy disk is recognized as a license floppy disk 29, and software installation from the CD 31 to the computer 20 continues.

If the license floppy disk 29 is present, the present invention next determines whether installation of the software from the CD 31 to the computer 20 is authorized. The basis of the determination is the evaluation of computer identification information stored in the archive information file of the license floppy 29. Identification information is unique to every computer. In essence, identification information is a type of "data fingerprint" by which an individual computer may be identified. Furthermore, various volumes (such as different drives or memory locations) of a particular computer may have their own unique identification information. The HDDI feature of the present invention stores the identification information of the computer 20 on the license floppy disk 29 in the archive information file after each installation of the software from the CD 31. Archive information which has been modified to reflect software installation activity is known as updated archive information. The ultimate determination is whether a predetermined number of authorized installations for the particular software, as determined by the number of computer identification information stored in the archive information file, has already been equaled. If so, further installations are disallowed.

This may be accomplished by the HDDI feature reading the computer identification information of the computer 20 and comparing it to computer identification information already stored in the archive information file. If the computer identification information is already in the archive information file (meaning the software program has been previously installed on the same computer), the HDDI feature will allow a subsequent installation to the same computer, as shown in the "YES" branch of decision block 242. Such a subsequent installation will be accomplished without modification of the archive information file. If the computer identification information is not already stored in the archive information file, the "NO" branch of decision block 242 results in the method of FIG. 2*a* moving to decision block 245.

Referring now to decision block 245, the present invention determines the number of recorded installations. The license floppy disk 29 also contains the predetermined number of authorized installations. The number of installations is determined by reference to the archive information file on the license floppy disk 29 on which is recorded the identification information of the computers onto which the software has been previously installed. More specifically, this may be accomplished by simply storing the number of allowable installations remaining. The method then compares the number of prior installations against the maximum number of permitted installations. Such comparison will reveal one of two results, namely (1) less than the maximum number of allowed installs have been made or (2) the maximum number of allowed installs have been made.

To illustrate the results, FIG. 2*a* arbitrarily depicts an embodiment in which three installations of the software are authorized per a license agreement and that number is recorded at the time of manufacture on the license floppy disk 29. In other words, the user may install the software on a total of three different computers. As indicated in step 245, if the number of previously recorded identification information of computers stored in the license floppy disk's archive identification file indicates that the software has been installed on less than three computers, the method proceeds to optional step 250 where a warning may be displayed for the user. The warning may indicate how many authorized installations remain, may simply indicate that each installation is being monitored with a view toward compliance with the license agreement, or may be any other appropriate warning. Once the warning dialog has been displayed, the method proceeds to step 251 where the method schedules an update of the archive information file on the linked floppy disk 29 to indicate one authorized installation has been initiated. When the user information is written to the floppy disk 29, the update records the identification information for the computer and decrements the number of authorized installations. The method then moves to step 220 where user information may be requested, and installation continues.

Should the authorization determination reveal that the number of authorized installations has been met (max.=3), the method proceeds to step 255 where the attempted installation is disallowed. Step 255 shows disallowance accompanied by a user prompt to call the software manufacturer. The manufacturer may then provide further explanation or a "work around", depending on individual circumstances.

Referring back to step 240, if the HDDI feature of the present invention is enabled on the CD 31 and the license floppy disk 29 is not present in the magnetic disk drive 28, a prompt is issued to the user in any previously described acceptable manner to urge the user to insert the license floppy disk 29, as shown in step 260 of FIG. 2*b*. The prompt dialog will allow the user to either "CANCEL" or continue by selecting "OK". If, "OK" is selected, another inquiry is made to determine whether the license floppy disk 29 is present, shown at decision block 265. If so, the method continues with the computer identification at step 242 of FIG. 2*a*, as previously discussed. Otherwise, if the user selected CANCEL, a final warning is issued at step 270.

The final warning of step 270 may provide the user an option to quit installation and, thereby, end the method at step 299. Alternately, the final warning of step 270 may provide the user yet another opportunity to insert the license floppy disk 29 into the computer. Such a selection by a user returns the method to step 260.

The Uninstall Feature

The HDDI feature of the present invention may comprise additional features to make the present invention more user-friendly than its predecessors. One such feature may be the uninstall feature. Specifically, the HDDI feature of the present invention may, via the uninstall feature, contemplate situations in which a user no longer uses the software program on a particular computer but desires to install the software on a different, perhaps new computer. If the user has already installed the software on three different computers and is only authorized three installations of the software, installation to a newly purchased computer would normally be disallowed, despite the fact that the new computer was to replace one of the computers onto which the software had been previously installed. Optimally, the uninstall feature of the present invention may be embedded in the actual software program which is installed on the computer 20.

Figure 3:
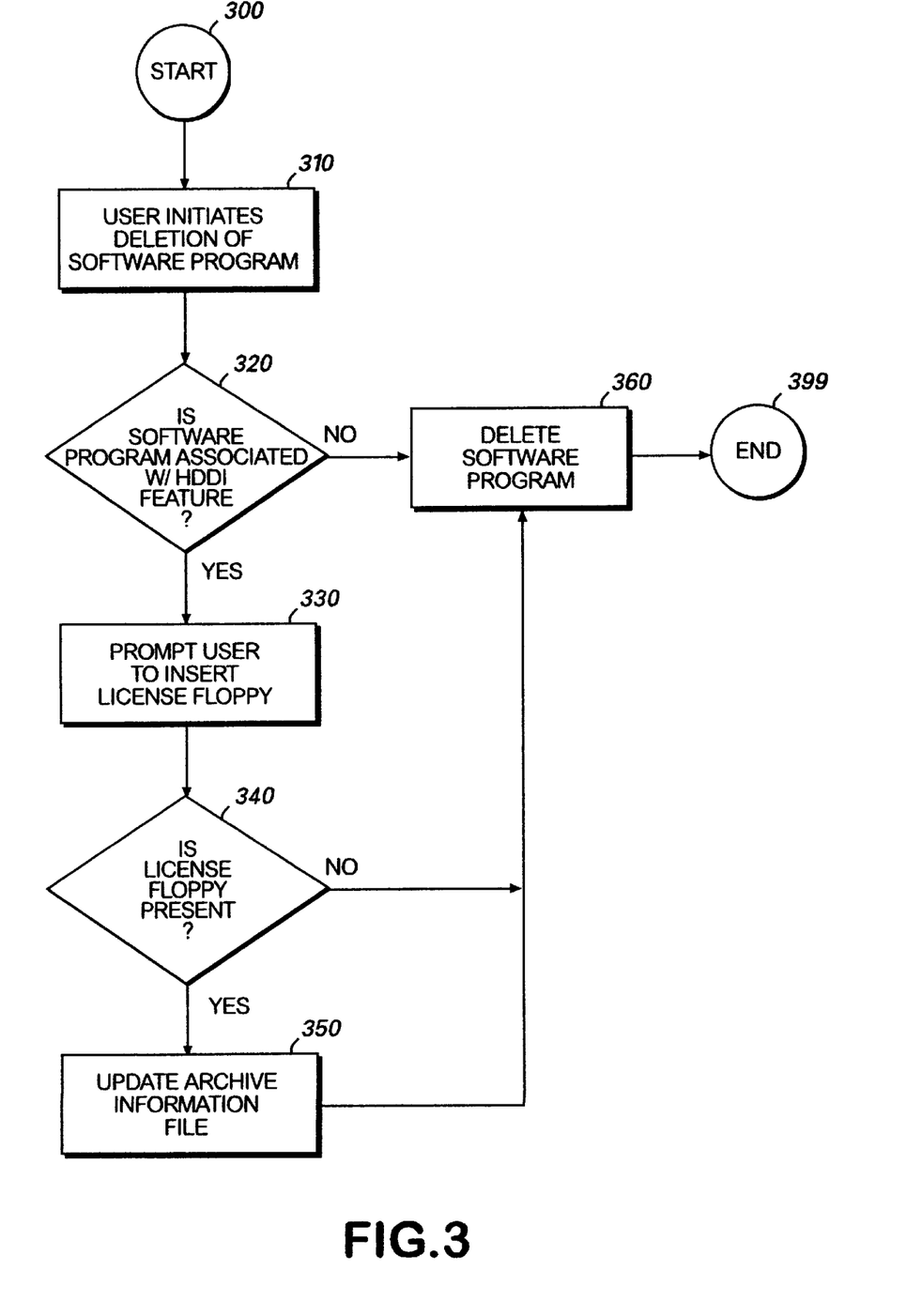
FIG. 3 is a flow diagram illustrating the operational steps of the uninstall feature of the present invention.

FIG. 3 is a flow diagram illustrating the uninstall feature of the present invention. The method depicted in FIG. 3 begins at step 300 and, at step 310, the user initiates deletion or removal of the software program from any computer on which it has been installed (the "target computer"). For the purpose of illustration, the following example will be based on the scenario wherein the target computer is the computer 20 previously referred to in the description of the preferred embodiment. At decision block 320, if the computer software program is not associated with the HDDI feature described above, the software program will be deleted in the well known, conventional manner at step 360 and the method will end at step 399.

If, on the other hand, the software program is associated with the HDDI feature, the user will be prompted to insert the license floppy disk 29 into the computer 20, as shown in step 330. Inserting the license floppy 29 will allow the user to receive "credit" against the number of installations allowed per the license agreement, as recorded in the updated archive information file of the license floppy 29. To issue such credit, the software program, at decision block 340, determines whether the license floppy 29 is present. If the user does not insert the license floppy disk 29 prior to final removal of the software program from the computer 20, the software program is deleted at step 360, and the method ends at step 399. In such a situation, no credit is given against the number of installations recorded in the updated archive information file. As such, subsequent attempts to install the software on new computers may be disallowed.

On the other hand, should the user insert the license floppy disk 29 at the specified time prior to removal of the software program from the target computer, the uninstall feature of the present invention will update the archive information file and, effectively, credit the user for the removal, shown in step 350. Such a credit allows installation of the software program onto the new computer, even though the installation may actually be the fourth such installation of the software. After updating the archive information file, the software program is deleted at step 360 and the method ends at step 399.

The uninstall "credit" may be issued in several ways. For example, the method may simply increase the number of authorized installations recorded on the license floppy disk 29 by one. Accordingly, such implementation of the uninstall feature would result in an archive information file in which computer identification information existed for either three or four computers, depending on the method of implementation. Regardless, because the number of allowed installations has been increased by one, a subsequent installation would then be allowed.

An alternate embodiment of the uninstall feature may direct the deletion of one of the computer identification information designators (ideally the identification information number of the target computer) from the archive information file and decrementing the installation count by one. Such an implementation would leave, in the present example, only two computers identified as having had the software program installed thereon. Again, the user could then install the software program on a new computer without having to contact the manufacturer for system workarounds.

The Laptop Bypass Feature

The present invention may also contain a laptop bypass feature to facilitate authorized installation of software programs onto laptop or other portable computers. As previously discussed, the present invention requires the simultaneous presence of both the CD 31 and the license floppy disk 29 within a computer 20 to verify the authorization of the user to install the software program. Because few laptop or laptop-type computers contain both an optical disk drive 30 and a magnetic disk drive 28, the otherwise authorized installation of software protected by the HDDI feature would be prohibited.

Figure 4:
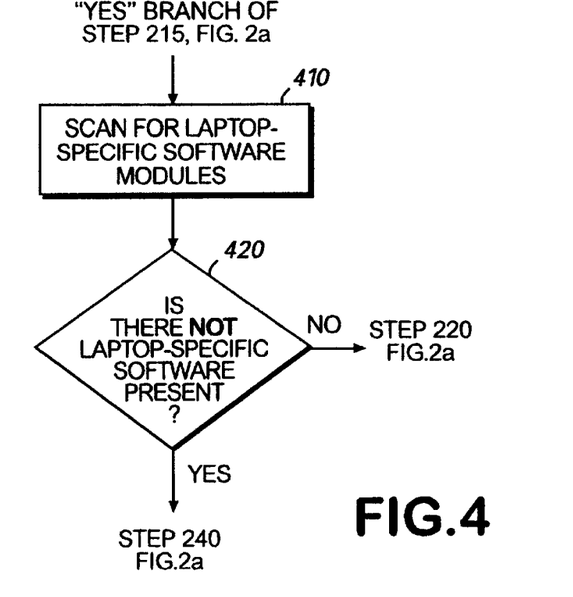
FIG. 4 is a flow diagram illustrating the operational steps of the laptop bypass feature of the present invention.

This dilemma is addressed by the laptop bypass feature, which may be embedded within an initialization portion of the HDDI feature contained on the CD 31. FIG. 4 depicts a method of implementation of such feature. Specifically, the laptop bypass feature may begin at the "NO" branch of step 240 of FIG. 2a. If the HDDI feature of the present invention is associated with the computer software program the user seeks to install on the computer 20, the HDDI feature may scan the computer for indications as to whether the computer is of the laptop variety, shown in step 410. Subsequently, as depicted in decision block 420, a determination is made as to whether at least two external drives are available.

If two external drives are not available, simultaneous insertion of two disks is not possible. The HDDI feature recognizes such a situation by detecting the "Plug n Play" aspect of the BIOS 26. Recognition of Plug n Play within BIOS 26 indicates to the HDDI feature that the present computer is a laptop. The HDDI feature will then temporarily disable itself and allow installation of the computer software by requesting the user to input user information, as in step 220 of FIG. 2a. Thereafter, the installation may be completed in the previously described manner. If, alternately, there is no indication that the computer is a laptop, the HDDI feature will continue its normal course by querying, at step 240 of FIG. 2a, whether the computer identification information is in the archive information file.

Although the laptop bypass feature has been discussed with respect to its operation with laptop-type computers, it is specifically contemplated that the feature could be implemented with any computer that does not posses both optical and magnetic disk drives. In particular, the previously discussed scan of the computer 20 to determine whether the computer 20 is a laptop is easily expanded to determine whether the aforementioned disk drives are present. One such method may be to look for drive-specific software drivers or a Plug n Play feature, as described above. If not, the HDDI feature may temporarily disable itself in the same fashion as intended in the context of laptop computers.

The Reformatting Feature

Another feature of the present invention may permit reinstallation of a software program onto a computer hard drive to which the software had already been installed, but which computer hard drive was subsequently reformatted. Such a feature is advantageous because reformatting a computer hard disk may result in the computer 20 having different computer identification information. More specifically, reformatting erases the contents of the hard drive and, in the process of reformatting, establishes new computer identification information. As such, during reinstallation of the software program, it would appear to the HDDI software on the license floppy disk 29 that the installation was occurring to an altogether different computer.

In such a situation, if the HDDI feature is enabled, the user may have difficulty re-installing the software. Specifically, if the user has already installed the software on three different computers, thereby equaling the limits of the license (per the present example), another installation would be disallowed. Such disallowance would not be intended by the typical software manufacturer, given the circumstances. The reformatting feature of the present invention, however, may be implemented to solve this problem and, thereby, save both user and manufacturer time and embarrassment.

Figure 5:
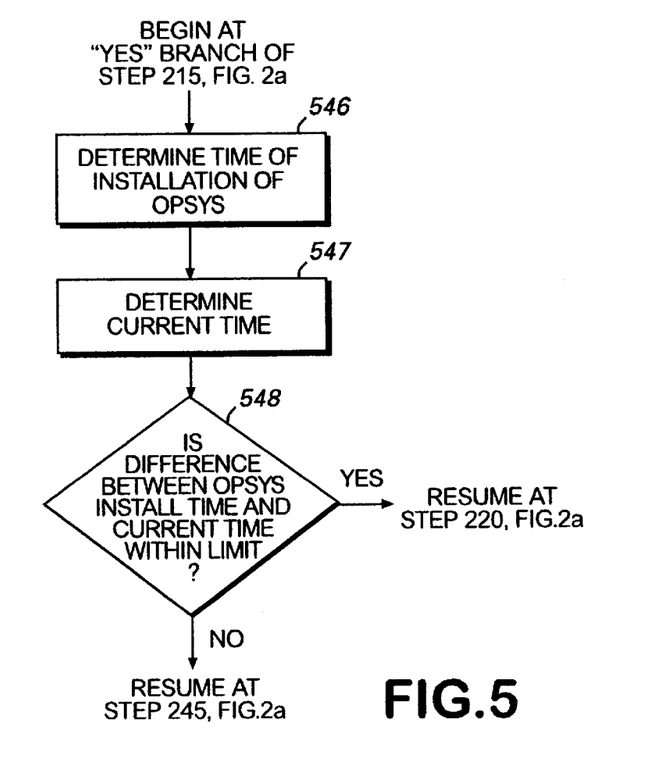
FIG. 5 is a flow diagram illustrating the operational steps of the reformatting solution feature of the present invention.

FIG. 5 illustrates the operative steps of the reformatting feature. The reformatting feature may be implemented responsive to selection of the "NO" branch of step 242 of FIG. 2a. When activated, the reformatting feature determines the date and time of installation of the operating system (OpSys) onto the hard drive of the computer, shown at step 546. Then, at step 547, the method determines the current date and time. At decision block 548, the method determines whether the difference between date and time of installation of the OpSys and the current date and time is within a predetermined limit. If the two times are within a predetermined chronological proximity, the method follows the "YES" branch to step 220 of FIG. 2a where the installation continues. The result is a "free" installation. The assumption underlying this feature is that installation of the software so soon after installation of the operating system 35 indicates recent reformatting of the computer hard drive.

If the times are not within the predetermined chronological proximity at step 548, the method returns to step 240 of FIG. 2a and the method continues as previously described to detect the floppy.

SUMMARY OF THE DETAILED DESCRIPTION

From the foregoing description, it will be appreciated that the present invention provides a system and method for limiting the number of installations of a computer software program stored on a device such as a CD from the CD to one or more computers. In an embodiment of the present invention referred to hereinabove as the uninstall feature, the present invention allows additional installations of the software if the user has properly uninstalled the software from computer on which the software previously resided.

In another aspect of the present invention, the laptop bypass feature may facilitate authorized installation of software programs onto laptop or other computers which do not have both optical and magnetic disk drives.

Finally, another aspect of the present invention may permit reinstallation of a software program onto a computer hard drive to which the software had already been installed, but which computer hard drive was subsequently reformatted, resulting in different computer identification information.

The foregoing system may be conveniently implemented in a program module that is based upon the flow charts in FIGS. 2a and 2b. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of limiting installations of computer software from devices such as CDs to one or more computers. However, those skilled in the art will understand that the principles of the present invention apply to any tasks or processes that require storing, viewing, editing, or processing parts of a compound document whether the parts are stored in a single file or not.

Alternative embodiments will become apparent to those skilled in the art to which the present invention pertains without departing from its spirit and scope. Accordingly, the scope of the present invention is defined by the appended claims rather than the foregoing description.

We claim:

1. A computer-implemented method for installing computer software from a read only storage medium onto a computer in a manner that prevents piracy, comprising the steps of:
    determining identification information for the computer;
    determining if the identification information for the computer is included in a removable read/write storage medium that stores identification information for all computers onto which the software is currently installed;
    if the identification information for the computer is included in the removable read/write storage medium, determining that an installation of the software from the read only storage medium onto the computer is authorized;
    if the identification information for the computer is not included in the removable read/write storage medium, determining a total number of the computers onto which the software is currently installed;
    determining if the total number is less than a predetermined limit;
    if the total number is less than a predetermined limit, then determining that the installation is authorized; and
    if the total number is not less than a predetermined limit, then determining that the installation is not authorized; and
    if and only if the installation is authorized,
        installing the software from the read only storage medium onto the computer; and
        storing the identification information for the computer on the removable read/write storage medium if the identification information for the computer is not included in the removable read/write storage medium.

2. The method of claim 1, wherein the step of determining the total number of the computers onto which the software is currently installed comprises the step of determining how many computers are represented by the identification information stored in the removable read/write storage medium.

3. The method of claim 1, wherein the read only storage medium comprises a CD-ROM and the removable read/write storage medium comprises a floppy disk.

4. The method of claim 1, further comprising the steps of:
    removing the software from the computer; and
    deleting the identification information for the computer from the removable read/write storage medium.

5. A computer-readable medium having computer-executable instructions for performing the method of claim 1.

6. A computer-implemented method for installing computer software from a read only storage medium onto a computer in a manner that prevents piracy, comprising the steps of:
    determining identification information for the computer;
    determining if the identification information for the computer is included in a removable read/write storage medium that stores identification information for all computers onto which the software is currently installed;
    if the identification information for the computer is included in the removable read/write storage medium, determining that an installation of the software from the read only storage medium onto the computer is authorized;
    if the identification information for the computer is not included in the removable read/write storage medium, determining if a number of remaining authorized installations of the computer software is greater than zero;
    if the number of remaining authorized installations of the software is greater than zero, then determining that the installation is authorized; and
    if the number of remaining authorized installations of the software is not greater than zero, then determining that the installation is not authorized; and
    if the installation is authorized,
        installing the software from the read only storage medium onto the computer; and
        storing the identification information for the computer on the removable read/write storage medium if the identification information for the computer is not included in the removable read/write storage medium.

7. A computer-readable medium having computer-executable instructions for performing the method of claim 6.

8. A computer-implemented method for installing computer software from a read only storage medium onto a computer in a manner that prevents piracy, comprising:
    determining if a formatting date of a permanent read/write storage device of the computer is within a predetermined chronological proximity of a current date;

if the formatting date is within the predetermined chronological proximity of the current date, installing the software from the read only storage medium to the permanent read/write storage device of the computer; and if the formatting date is not within the predetermined chronological proximity of the current date,
determining if an installation from the read only storage medium onto the computer is authorized based upon installation history information, stored in a removable read/write storage medium, for the software on the read only storage medium; and
if the installation is authorized,
installing the software from the read only storage medium to the permanent read/write storage device of the computer; and
updating the installation history information on the removable read/write storage medium to reflect the installation of the software.

9. A computer-readable medium having computer-executable instructions for performing the method of claim 8.

10. A computer-implemented method for installing computer software from a read only storage medium onto a computer in a manner that prevents piracy, comprising:
determining if the computer comprises a laptop;
if the computer comprises the laptop, installing the software from the read only storage medium to a permanent read/write storage device of the computer; and
if the computer does not comprise the laptop,
determining if an installation from the read only storage medium onto the computer is authorized based upon installation history information, stored in a removable read/write storage medium, for the software on the read only storage medium; and
if the installation is authorized,
installing the software from the read only storage medium to the permanent read/write storage device; and
updating the installation history information on the removable read/write storage medium to reflect the installation of the software.

11. The method of claim 10, wherein the step of determining if the computer comprises the laptop further comprises the steps of:
searching for laptop-specific software on the permanent read/write storage device of the computer; and
determining that the computer comprises the laptop if the laptop-specific software is found.

12. A computer-readable medium having computer-executable instructions for performing the method of claim 10.

13. A computer-implemented method for installing computer software from a read only storage medium onto a computer in a manner that prevents piracy, comprising:
determining if the computer has a drive that can read a removable read/write storage medium;
if the computer does not have the drive that can read the removable read/write storage medium, then installing the software from the read only storage medium to a permanent read/write storage device of the computer; and
if the computer does have the drive that can read the removable read/write storage medium,
determining if an installation from the read only storage medium onto the computer is authorized based upon installation history information, stored in the removable read/write storage medium, for the software on the read only storage medium; and
if the installation is authorized,
installing the software from the read only storage medium to the permanent read/write storage; and
updating the installation history information on the removable read/write storage medium to reflect the installation of the software.

14. A computer-readable medium having computer-executable instructions for performing the method of claim 13.

* * * * *